(12) United States Patent
Matsui et al.

(10) Patent No.: US 12,270,498 B2
(45) Date of Patent: Apr. 8, 2025

(54) TUBE COUPLING

(71) Applicant: Panasonic Intellectual Property Management Co., Ltd., Osaka (JP)

(72) Inventors: Shigeyoshi Matsui, Osaka (JP); Toshihiko Matsuda, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 17 days.

(21) Appl. No.: 17/981,810

(22) Filed: Nov. 7, 2022

(65) Prior Publication Data
US 2023/0141879 A1 May 11, 2023

(30) Foreign Application Priority Data
Nov. 9, 2021 (JP) ................................ 2021-182621

(51) Int. Cl.
| | |
|---|---|
| *F16L 37/084* | (2006.01) |
| *F16L 37/24* | (2006.01) |
| *F16L 37/248* | (2006.01) |
| *F16L 37/34* | (2006.01) |
| *F16L 37/36* | (2006.01) |

(52) U.S. Cl.
CPC ......... *F16L 37/0841* (2013.01); *F16L 37/248* (2013.01); *F16L 37/34* (2013.01); *F16L 37/24* (2013.01); *F16L 37/36* (2013.01)

(58) Field of Classification Search
CPC ....... F16L 37/24; F16L 37/244; F16L 37/248; F16L 37/252; F16L 37/107; F16L 37/113; F16L 37/34; F16L 37/36
See application file for complete search history.

(56) References Cited

U.S. PATENT DOCUMENTS

| | | | | |
|---|---|---|---|---|
| 4,124,228 | A | * | 11/1978 | Morrison ................ F16L 37/34 |
| 4,289,164 | A | * | 9/1981 | Ekman ..................... F16L 37/34 |
| 5,129,423 | A | * | 7/1992 | Fournier ................. F16L 37/34 |
| 5,316,041 | A | | 5/1994 | Ramacier, Jr. et al. |
| 5,494,074 | A | | 2/1996 | Ramacier, Jr. et al. |

(Continued)

FOREIGN PATENT DOCUMENTS

| | | |
|---|---|---|
| EP | 3593025 A1 | 1/2020 |
| JP | 54-10520 | 1/1979 |

(Continued)

*Primary Examiner* — William S. Choi
(74) *Attorney, Agent, or Firm* — Wenderoth, Lind & Ponack, L.L.P.

(57) ABSTRACT

A tube coupling is configured to connect and couple two tubes that are configured to cause a fluid to flow inside the two tubes. The tube coupling includes: a male connector including a first pipe configured to cause the fluid to flow inside the first pipe, and an insertion part having a protruding shape protruding in an axial direction that is an insertion direction; and a female connector including a second pipe configured to cause the fluid to flow inside the second pipe, and an insertion receiving part having a recessed shape recessed in the axial direction and coupled to the insertion part when the insertion part is inserted into the insertion receiving part. The insertion part includes a first spring, a first pressing member having a protruding shape, a first seal member having an annular shape, and a first outer peripheral member surrounding the first pressing member.

4 Claims, 5 Drawing Sheets

(56) References Cited

U.S. PATENT DOCUMENTS

| | | | |
|---|---|---|---|
| 6,328,348 B1 * | 12/2001 | Cornford | F16L 37/34 |
| 2007/0274772 A1 * | 11/2007 | Tiberghien | F16L 37/107 |
| 2012/0139234 A1 | 6/2012 | Kawamura | |
| 2015/0377402 A1 * | 12/2015 | Boothe | |
| 2018/0238480 A1 * | 8/2018 | Scott | F16L 37/36 |
| 2018/0256878 A1 * | 9/2018 | Ciccone | F16L 37/36 |

FOREIGN PATENT DOCUMENTS

| | | |
|---|---|---|
| JP | 8-54090 | 2/1996 |
| JP | 8-247366 | 9/1996 |
| JP | 9-511047 | 11/1997 |
| JP | 10-61860 | 3/1998 |
| JP | 2942456 | 8/1999 |
| JP | 3482496 | 12/2003 |
| JP | 2006-300127 | 11/2006 |
| JP | 2007-177859 | 7/2007 |
| JP | 2013-2531 | 1/2013 |
| JP | 2019-027562 | 2/2019 |
| JP | 2020-509810 A | 4/2020 |
| WO | WO1990015283 A1 * | 12/1990 |
| WO | 94/10494 | 5/1994 |
| WO | 95/26479 | 10/1995 |
| WO | 2011/021348 | 2/2011 |
| WO | 2012/173151 | 12/2012 |
| WO | 2018/165375 A1 | 9/2018 |

* cited by examiner

FEMALE CONNECTOR

MALE CONNECTOR

TUBE COUPLING

BACKGROUND

1. Technical Field

The present disclosure relates to a tube coupling including a male connector and a female connector that can be coupled to each other.

2. Description of the Related Art

There is a conventionally known quick connection coupling valve assembly that includes a male coupling member, a female coupling member, first and second poppet members, first and second sealing members, and a clip part (see, for example, Japanese Patent No. 3482496). In this quick connection coupling valve assembly, the respective poppet members of the male and female coupling members are axially movable. Each of the poppet members has a tip end, which protrudes from a housing member, and which tapers as the axial distance from the base end increases. A liquid seal member is provided between the poppet member and the housing member, and forms the maximum diameter at the tip end. A fluid flow is guided along the maximum diameter.

The above structure reduces a stroke amount required until sealing is made for the fluid at the time of decoupling, thus allowing quick decoupling.

SUMMARY

However, in the quick connection coupling valve assembly, there is a large space, formed between the first and second sealing members spanning the female and male coupling members, in which the liquid remains. Thus, a large amount of liquid leakage may occur at the time of disengagement of the female and male coupling members.

It is an object of the present disclosure to provide a tube coupling capable of reducing liquid leakage at the time of disengagement.

A tube coupling according to the present disclosure is a tube coupling configured to connect and couple two tubes that are configured to cause a fluid to flow inside the two tubes. The tube coupling includes: a male connector including a first pipe configured to cause the fluid to flow inside the first pipe, and an insertion part having a protruding shape protruding in an axial direction that is an insertion direction; and a female connector including a second pipe configured to cause the fluid to flow inside the second pipe, and an insertion receiving part having a recessed shape recessed in the axial direction and coupled to the insertion part when the insertion part is inserted into the insertion receiving part. The insertion part includes: a first spring; a first pressing member having a protruding shape protruding in the axial direction, the first pressing member being biased in the axial direction by the first spring when the male connector is not inserted into the female connector; a first seal member having an annular shape, the first seal member being disposed around the first pressing member; and a first outer peripheral member supporting the first spring in the axial direction, the first outer peripheral member being spaced from the first pressing member and surrounding the first pressing member. When the first pressing member is biased by the first spring, the first outer peripheral member is caused to abut on the first seal member, and a flow path between the first pipe and the second pipe is closed. When the first spring is compressed, the first outer peripheral member is separated from the first seal member, and the flow path is opened. The insertion receiving part includes: a second spring; a second pressing member having a protruding shape protruding in the axial direction, the second pressing member being biased outward in the axial direction by the second spring when the male connector is not inserted into the female connector, the second pressing member being caused to abut on the first pressing member when the male connector is inserted into the female connector; a second seal member having an annular shape, the second seal member being disposed around the second pressing member; and a second outer peripheral member. When the second pressing member is biased by the second spring, the second outer peripheral member is caused to abut on the second seal member, and the flow path is closed. When the second pressing member is not biased by the second spring, the second outer peripheral member is separated from the second seal member, and the flow path is opened. When the first spring biases the first pressing member and the second spring biases the second pressing member, the first outer peripheral member is caused to abut on the first seal member and the second outer peripheral member is caused to abut on the second seal member, and the flow path is brought into a closed state. When the male connector is inserted into the female connector and the first spring and the second spring are compressed, the first outer peripheral member is separated from the first seal member and the second outer peripheral member is separated from the second seal member, and the flow path is brought into an open state. The second seal member has an outer diameter smaller than an outer diameter of the first seal member.

With a tube coupling according to the present disclosure, the outer diameter of a second seal member is smaller than the outer diameter of a first seal member, and thus it is possible to reduce liquid leakage at the time of disengagement.

DETAILED DESCRIPTION

Figure 1:
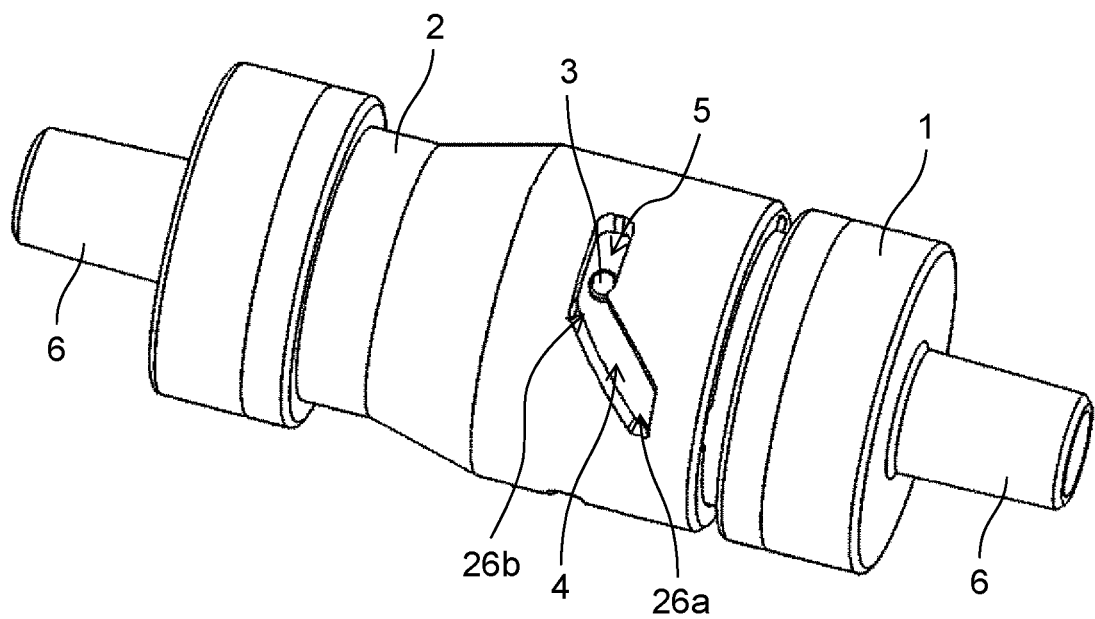
FIG. 1 is a schematic perspective view of a tube coupling according to a first exemplary embodiment, the view illustrating an outer appearance of the tube coupling in an open state where a flow path in the tube coupling is opened.

A tube coupling according to a first aspect is a tube coupling configured to connect and couple tubes that are configured to cause a fluid to flow inside the tubes. The tube coupling includes a male connector and a female connector. The male connector includes a first pipe that is configured to cause the fluid to flow inside the first pipe, and also includes an insertion part having a protruding shape protruding in an axial direction that is an insertion direction. The female connector includes a second pipe that is configured to cause the fluid to flow inside the second pipe, and also includes an insertion receiving part that has a recessed shape recessed in the axial direction and that is coupled to the insertion part when the insertion part is inserted into the insertion receiving part. The insertion part includes a first pressing member, a first seal member, and a first outer peripheral member. The first pressing member has a protruding shape protruding in the axial direction, and is biased outward in the axial direction by a first spring in a state where the male connector is not inserted into the female connector. The first seal member has an annular shape, and is disposed around the first pressing member. The first outer peripheral member supports the first spring in the axial direction. The first outer peripheral member is spaced from the first pressing member, and annularly surrounds the periphery around the axial direction of the first pressing member. The first outer peripheral member is caused to abut on the first seal member, and a flow path between the first pipe and the second pipe is closed, when the first pressing member is biased by the first spring. The first outer peripheral member is separated from the first seal member, and the flow path between the first pipe and the second pipe is opened, when the first spring is compressed. The insertion receiving part includes a second pressing member, a second seal member, and a second outer peripheral member. The second pressing member has a protruding shape protruding in the axial direction. The second pressing member is biased outward in the axial direction by a second spring in a state where the male connector is not inserted into the female connector. The second pressing member is caused to abut on the first pressing member when the male connector is inserted into the female connector. The second seal member has an annular shape, and is disposed around the second pressing member. The second outer peripheral member is caused to abut on the second seal member, and the flow path between the first pipe and the second pipe is closed, in a state where the second pressing member is biased by the second spring and the male connector is not inserted into the female connector. The second outer peripheral member is separated from the second seal member, and the flow path between the first pipe and the second pipe is opened, when the second spring is compressed. When the male connector is inserted into the female connector, the first pressing member and the second pressing member are caused to abut on each other, the first pressing member is biased by the first spring, and the second pressing member is biased by the second spring, the first outer peripheral member and the second outer peripheral member are caused to abut on the first seal member and the second seal member, respectively, and a closed state is obtained in which the flow path between the first pipe and the second pipe is closed. When the first spring and the second spring are compressed, the first outer peripheral member and the second outer peripheral member are separated from the first seal member and the second seal member, respectively, and an open state is obtained in which the flow path between the first pipe and the second pipe is opened. The second seal member has an outer diameter smaller than an outer diameter of the first seal member.

A tube coupling according to a second aspect may be the tube coupling in the first aspect, in which the outer diameters from the first pressing member to the second pressing member between the first seal member and the second seal member may taper from the outer diameter of the first seal member to the outer diameter of the second seal member.

A tube coupling according to a third aspect may be the tube coupling in the first or second aspect, which may further include an outer seal member. In this case, the outer seal member may be configured to perform sealing between the first outer peripheral member or the second outer peripheral member, and an annular outer peripheral member, of the female connector, surrounding the respective outer peripheries of the first outer peripheral member and the second outer peripheral member.

Hereinafter, a tube coupling according to exemplary embodiments will be described with reference to the accompanying drawings. In the drawings, substantially the same members are denoted by the same reference signs.

FIRST EXEMPLARY EMBODIMENT

Figure 2:
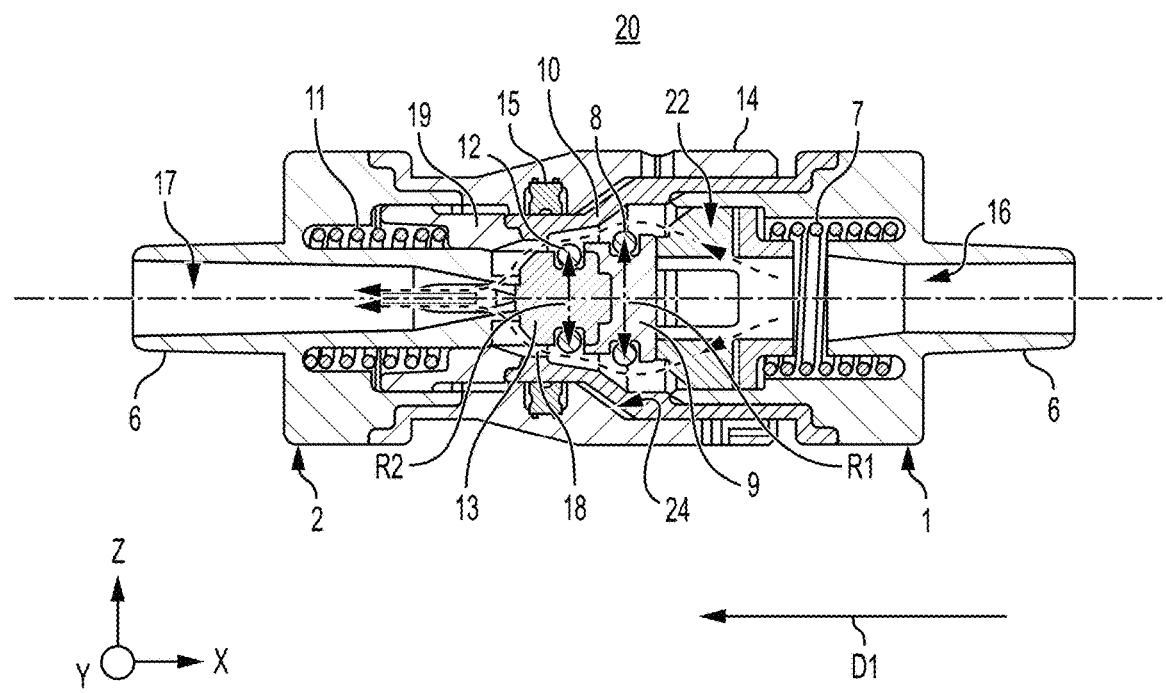
FIG. 2 is a cross-sectional view illustrating the tube coupling in FIG. 1, which is in the open state where the flow path is opened, as viewed from a direction perpendicular to an axial direction.
Figure 3:
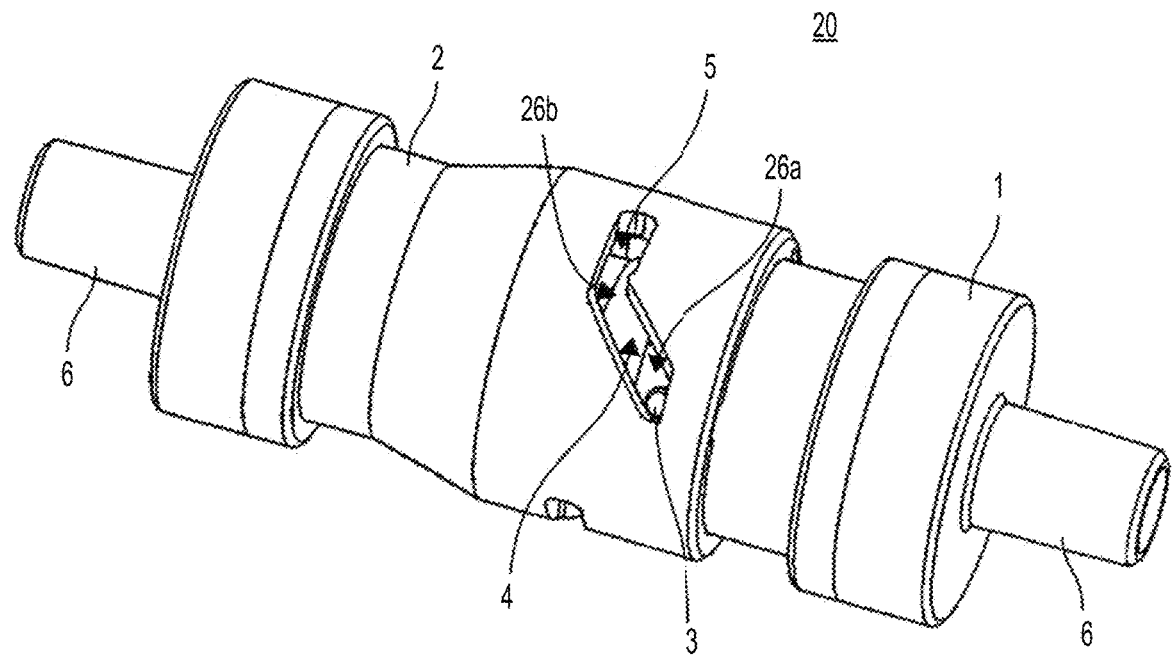
FIG. 3 is a schematic perspective view of the tube coupling according to the first exemplary embodiment, the view illustrating an outer appearance of the tube coupling in a closed state where the flow path in the tube coupling is closed.
Figure 4:
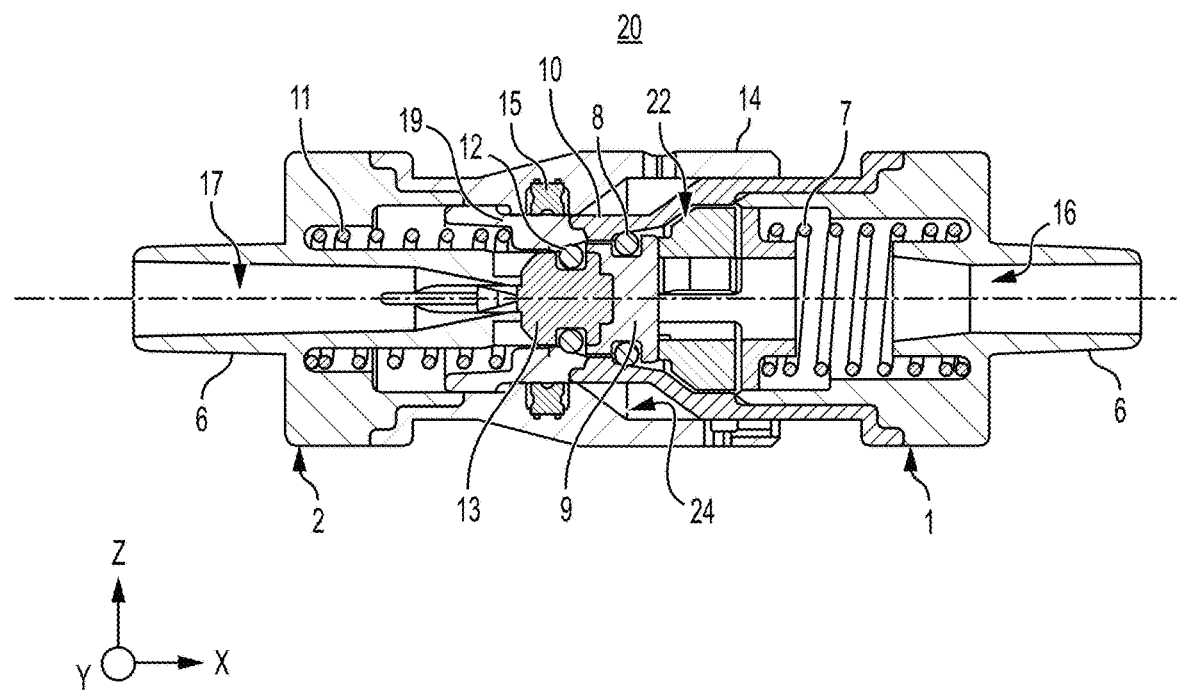
FIG. 4 is a cross-sectional view illustrating the tube coupling in FIG. 3, which is in the closed state where the flow path is closed, as viewed from the direction perpendicular to the axial direction.
Figure 5:
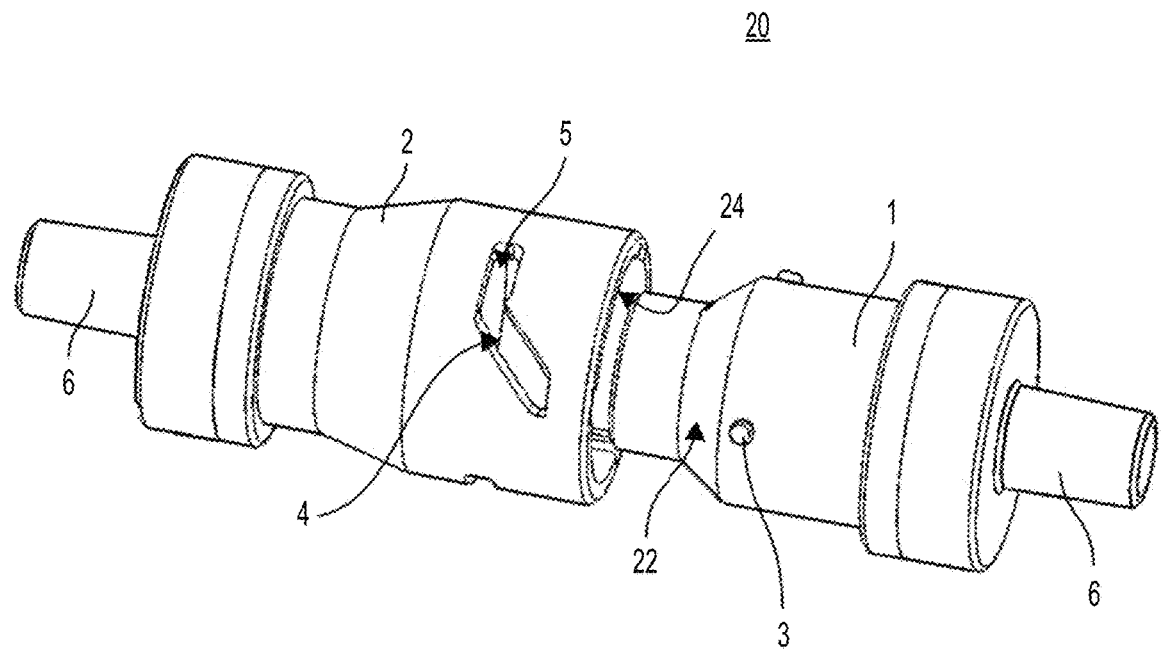
FIG. 5 is a schematic perspective view of the tube coupling according to the first exemplary embodiment, the view illustrating the tube coupling in a state before a male connector of the tube coupling is inserted into a female connector of the tube coupling.

FIG. 1 is a schematic perspective view of tube coupling 20 according to a first exemplary embodiment, the view illustrating an outer appearance of tube coupling 20 in an open state where flow path 18 in tube coupling 20 is opened. FIG. 2 is a cross-sectional view illustrating tube coupling 20 in FIG. 1, which is in the open state where flow path 18 is opened, as viewed from a direction perpendicular to an axial direction. FIG. 3 is a schematic perspective view of tube coupling 20 according to the first exemplary embodiment, the view illustrating an outer appearance of tube coupling 20 in a closed state where flow path 18 in tube coupling 20 is closed. FIG. 4 is a cross-sectional view illustrating tube coupling 20 in FIG. 3, which is in the closed state where flow path 18 is closed, as viewed from the direction perpendicular to the axial direction. FIG. 5 is a schematic perspective view of tube coupling 20 according to the first exemplary embodiment, the view illustrating tube coupling 20 in a state before male connector 1 of tube coupling 20 is inserted into female connector 2 of tube coupling 20.

For convenience, an axial direction, which is an insertion direction, is defined as an X-direction, one direction perpendicular to the X-direction on a horizontal plane is defined as a Y-direction, and a vertically upward direction is defined as a Z-direction.

Tube coupling 20 according to the first exemplary embodiment is a tube coupling for connecting and coupling two tubes (not illustrated). The two tubes are configured to cause a fluid to flow inside the two tubes. Tube coupling 20 includes male connector 1 and female connector 2.

Hereinafter, respective members that are components of tube coupling 20 will be described.

<Male Connector>

Male connector 1 includes first pipe 16 that is configured to cause a fluid to flow inside first pipe 16, and also includes insertion part 22 that has a protruding shape protruding in the axial direction (X-direction), which is the insertion direction D1. As illustrated in FIG. 2, insertion part 22 protrudes in the insertion direction D1. Connection is made to the tube at tube connection part 6 formed at an end. First pipe 16 receives the fluid flowing from the tube.

<Insertion Part>

Insertion part 22 has a protruding shape protruding in the axial direction (X-direction), and includes first spring 7, first pressing member 9, first seal member 8, and first outer peripheral member 10.

<First Pressing Member>

First pressing member 9 has a protruding shape protruding in the axial direction, and is biased outward in the axial direction (X-direction) by first spring 7 in a state where male connector 1 is not inserted into female connector 2. First pressing member 9 protrudes in the axial direction.

<First Seal Member>

First seal member 8 has an annular shape, and is disposed around first pressing member 9. For example, an O-ring can be used for first seal member 8.

<First Outer Peripheral Member>

First outer peripheral member 10 supports first spring 7 in the axial direction (X-direction). First outer peripheral member 10 is spaced from first pressing member 9, and annularly surrounds a periphery in the axial direction (X-direction) of first pressing member 9.

When first pressing member 9 is biased by first spring 7, first outer peripheral member 10 is caused to abut on first seal member 8, and this causes flow path 18 between first pipe 16 of male connector 1 and second pipe 17 of female connector 2 to be closed. As a result, a closed state is obtained.

In contrast, when first spring 7 is compressed, first outer peripheral member 10 is separated from first seal member 8, and this causes flow path 18 between first pipe 16 and second pipe 17 to be opened. As a result, an open state is obtained.

First outer peripheral member 10 is connected to first pressing member 9 via first spring 7. Thus, the relative position in the axial direction between first outer peripheral member 10 and first pressing member 9 changes in accordance with an extended state and a compressed state of first spring 7.

<Projection>

Insertion part 22 may include projection 3 on a side surface around the axial direction (X-direction) of male connector 1. Projection 3 is not limited to a circular shape, and may be a polygonal shape such as a quadrangular shape. Note that friction can be further reduced when an edge of projection 3 is subjected to curved surface processing.

<Female Connector>

Female connector 2 includes second pipe 17 that is configured to cause a fluid to flow inside second pipe 17, and also includes insertion receiving part 24 that has a recessed shape recessed in the axial direction (X-direction), and that is coupled to insertion part 22 when insertion part 22 is inserted into insertion receiving part 24. As illustrated in FIG. 2, insertion receiving part 24 is recessed in the insertion direction D1 (axial direction). Note that the insertion direction D1 is a direction in which insertion part 22 is inserted into insertion receiving part 24. Connection is made to the tube at tube connection part 6 formed at an end. Second pipe 17 receives the fluid flowing from the tube.

<Insertion Receiving Part>

Insertion receiving part 24 has a recessed shape recessed in the axial direction (X-direction), and includes second spring 11, second pressing member 13, second seal member 12, and second outer peripheral member 19.

<Second Pressing Member>

Second pressing member 13 has a protruding shape protruding in the axial direction. When male connector 1 is inserted into female connector 2, second pressing member 13 is caused to abut on first pressing member 9.

<Second Seal Member>

Second seal member 12 has an annular shape, and is disposed around second pressing member 13. For example, an O-ring can be used for second seal member 12.

<Second Outer Peripheral Member>

Second outer peripheral member 19 is biased in the axial direction (X-direction) by second spring 11. When male connector 1 is separated, second outer peripheral member 19 is caused to abut on second seal member 12, and this causes flow path 18 between first pipe 16 of male connector 1 and second pipe 17 of female connector 2 to be closed. As a result, the closed state is obtained.

In contrast, when second spring 11 is compressed (when second outer peripheral member 19 is not biased by second spring 11), second outer peripheral member 19 is separated from second seal member 12, and this causes flow path 18 between first pipe 16 and second pipe 17 to be opened. As a result, the open state is obtained. Second outer peripheral member 19 is connected to second pressing member 13 via second spring 11. Thus, the relative position in the axial direction between second outer peripheral member 19 and second pressing member 13 changes in accordance with an extended state and a compressed state of second spring 11.

(Closed state)

In the closed state, male connector 1 is not completely inserted into female connector 2, as illustrated in FIG. 4. At this time, first pressing member 9 and second pressing member 13 are in abutment on each other, but do not press against each other. Thus, first spring 7 biases first pressing member 9, and second spring 11 biases second outer peripheral member 19. In this case, first outer peripheral member 10 and first seal member 8 are caused to abut on each other, and second outer peripheral member 19 and second seal member 12 are caused to abut on each other. This causes flow path 18 between first pipe 16 and second pipe 17 to be closed.

(Open State)

In contrast, in the open state, male connector 1 is completely inserted into female connector 2, as illustrated in FIG. 2. At this time, first pressing member 9 and second pressing member 13 press against each other, and thus first spring 7 and second spring 11 are compressed. Therefore, the relative position of first pressing member 9 and second pressing member 13 in the X-direction with respect to first outer peripheral member 10 and second outer peripheral member 19 changes in the positive direction in the X-direction. As a result, first outer peripheral member 10 is separated from first seal member 8, and second outer peripheral member 19 is separated from second seal member 12. Thus, flow path 18 between first pipe 16 and second pipe 17 is opened, as indicated by arrows in FIG. 2. In this case, the direction of a flow in flow path 18 is not limited to a direction from first pipe 16 toward second pipe 17, and may be a reverse direction from second pipe 17 toward first pipe 16. Flow path 18 is defined between first outer peripheral member 10 and second outer peripheral member 19, and first seal member 8 and second seal member 12, around the respective outer peripheries of first pressing member 9 and second pressing member 13.

When first seal member 8 and second seal member 12 have the same diameter, as described in Japanese Patent No. 3482496, it is necessary to perform closing of first seal member 8 and second seal member 12 with a surface parallel to the axis. Thus, a space in which liquid remains is formed between first seal member 8 and second seal member 12.

In contrast, outer diameter R2 of second seal member 12 is smaller than outer diameter R1 of first seal member 8, as illustrated in FIG. 2. That is, inclined surfaces (tapering surfaces) are defined from first seal member 8 of male connector 1 to second seal member 12 of female connector 2. Therefore, the outer diameter of first pressing member 9 and the outer diameter of second pressing member 13 taper from first seal member 8 to second seal member 12.

The above configuration includes the inclined surfaces from first seal member 8 to second seal member 12, in contrast to the case where first seal member 8 and second seal member 12 have the same diameter. Thus, flow path 18 can be closed by causing a corresponding inclined surface of first outer peripheral member 10 to abut on first seal member 8, and by causing a corresponding inclined surface of second outer peripheral member 19 to abut on second seal member 12. Therefore, it is possible to reduce a space in which liquid remains between first seal member 8 and second seal member 12. As a result, it is possible to reduce liquid remaining between first seal member 8 and second seal member 12, thereby reducing liquid leakage at the time of disengagement of the male connector and the female connector.

<Outer Seal Member>

As illustrated in FIGS. 2 and 4, female connector 2 may further include annular member 14 that surrounds first outer peripheral member 10 and second outer peripheral member 19. Female connector 2 may further include outer seal member 15 that performs sealing between second outer peripheral member 19 and annular member 14. Outer seal member 15 is caused to abut on first outer peripheral member 10 or second outer peripheral member 19, and first outer peripheral member 10 and second outer peripheral member 19 are shifted in the axial direction with respect to outer seal member 15. Thus, outer seal member 15 has, for example, an X-shaped cross-section. Outer seal member 15 has an X-shaped cross-section, and thus comes into contact with first outer peripheral member 10 or second outer peripheral member 19 at two points in the axial direction. Therefore, axial sliding resistance is smaller than that of a seal member having a normal circular shape.

Outer seal member 15 performs sealing by being in abutment on first outer peripheral member 10 or second outer peripheral member 19. Thus, liquid leakage can be reduced even when first outer peripheral member 10 and second outer peripheral member 19 are shifted in the axial direction in accordance with changes between the closed state and the open state.

<First Through Hole>

As illustrated in FIGS. 1 and 3, insertion receiving part 24 may include first through hole 4 that extends in a direction inclined with respect to the axial direction on a side surface around the axial direction (X-direction) of female connector 2, and that allows projection 3 to move therein.

Male connector 1 is connected to female connector 2 by guiding projection 3 in the axial direction along first through hole 4 of female connector 2.

When a hole is provided along the axial direction, it is necessary to push male connector 1 straight in the axial direction without rotating male connector 1. Thus, a large force is required. In contrast, first through hole 4 is provided so as to be inclined with respect to the axial direction, and thus it is possible to easily insert male connector 1 in the axial direction while male connector 1 is caused to rotate by using torque with a small force. First through hole 4 is inclined with respect to the axial direction, and thus it is possible to determine the rotation direction at the time of the push in the axial direction.

Here, the first through hole is a "through hole" penetrating the surface of female connector 2. However, the configuration is not limited to this. Instead, a groove may be provided on the back surface side of female connector 2 facing male connector 1. Even in this case, male connector 1 can be connected to female connector 2 by guiding projection 3, in a configuration where projection 3 is movable in the groove. In contrast, the first through hole as a "through hole" allows projection 3 to be visually recognizable from the external surface side of female connector 2, and this facilitates the guiding of projection 3, as compared with the groove that is not visually recognizable from the external surface side.

Here, a case has been described in which projection 3 is provided on the external surface side of male connector 1 and the groove is provided on the back surface side of female connector 2. However, the configuration is not limited to this, and the converse configuration may be adopted as well. For example, a groove may be provided on the external surface side of male connector 1, and a projection may be provided on the back surface side of female connector 2.

FIRST MODIFIED EXAMPLE

Figure 6A:
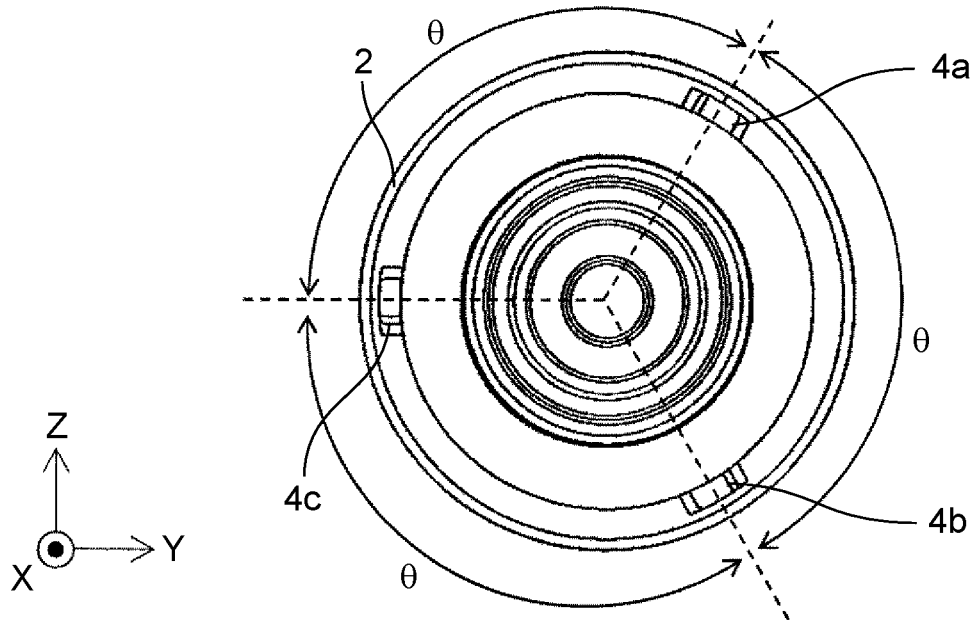
FIG. 6A is a cross-sectional view illustrating a female connector in a first modified example of the tube coupling according to the first exemplary embodiment, as viewed from the axial direction.
Figure 6B:
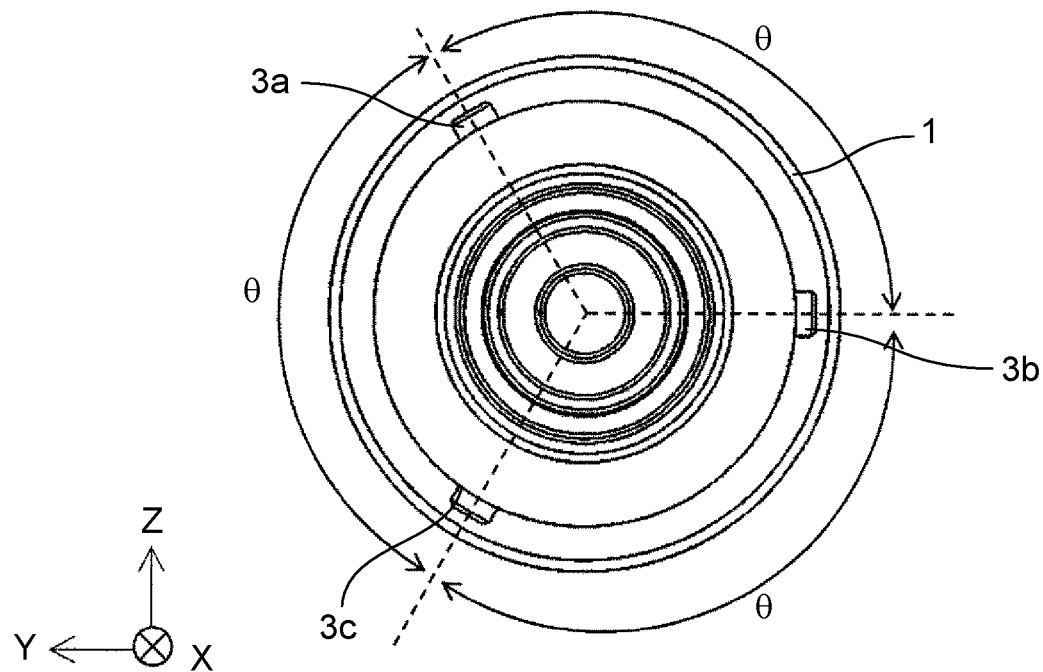
FIG. 6B is a cross-sectional view illustrating a male connector in the first modified example of the tube coupling according to the first exemplary embodiment, as viewed from the axial direction.

FIG. 6A is a cross-sectional view illustrating female connector 2 in a modified example of the tube coupling according to the first exemplary embodiment, as viewed from the axial direction. FIG. 6B is a cross-sectional view illustrating male connector 1 in the modified example of the tube coupling according to the first exemplary embodiment, as viewed from the axial direction.

In female connector 2 according to the modified example, three first through holes 4a, 4b, 4c are provided equiangularly around the axis while they are disposed along the circumferential direction. In male connector 1 according to the modified example, three projections 3a, 3b, 3c are provided equiangularly around the axis while they are disposed along the circumferential direction. In this case, any of three projections 3a, 3b, 3c can correspond to any of three first through holes 4a, 4b, 4c.

As described above, the configuration is not limited to the case where one projection 3 and one first through hole 4 are provided, and the plurality of projections 3 and the plurality of first through holes 4 may be provided as illustrated in FIGS. 6A and 6B. The plurality of projections 3 and the plurality of first through holes 4 are not necessarily provided equiangularly around the axis. The angles may be different from one another. In this case, projections 3 and first through holes 4 have limitation in their corresponding counterparts, and also have limitation in insertion angles. Further, the number of projections 3 may be set smaller than the number of the plurality of first through holes 4. For example, when the number of first through holes 4 is three as illustrated in FIG. 6A, the number of projections 3 may be two. In this case, an angle between the plurality of projections 3 and an angle between the plurality of first through holes 4 may be set to match respective corresponding angles. With these settings, it is possible to adjust a degree of freedom in disposing projection 3 with respect to the plurality of first through holes 4.

<Second Through Hole>

Second through hole 5 may be further included which is continuous with end 26b of first through hole 4 on the side in the axial direction along the in-plane direction of the side surface, and which extends in the circumferential direction substantially perpendicular to the axial direction, on the side surface extending in a direction intersecting the axial direction.

When projection 3 is fixed in the axial direction by second through hole 5, male connector 1 is connected to female connector 2. Further, it is possible to adjust the position of projection 3 along the circumferential direction by providing second through hole 5 to have a predetermined length in the circumferential direction. With this adjustment, it is possible to eliminate twisting of the tube due to the rotation of male connector 1. Second through hole 5 may be provided so as to form an angle of, for example, more than or equal to 20° with respect to the axis.

In FIGS. 1 and 3, second through hole 5 is provided so as to extend in a circumferential direction whose component is the same as a component in the circumferential direction of first through hole 4 from end 26b of first through hole 4 on the side in the axial direction. However, the configuration is not limited to this. Second through hole 5 may be provided so as to extend in a circumferential direction whose component is opposite to a component in the circumferential direction of first through hole 4. Second through hole 5 may further be provided so as to branch in two opposite directions from end 26b of first through hole 4 on the side in the axial direction. For example, second through hole 5 may be provided so as to have a T-shape with respect to first through hole 4.

A protrusion may further be provided at the boundary between first through hole 4 and second through hole 5 such that projection 3 is not easily movable between first through hole 4 and second through hole 5. The configuration allows stable retention of projection 3 in second through hole 5.

SECOND MODIFIED EXAMPLE

Figure 7:
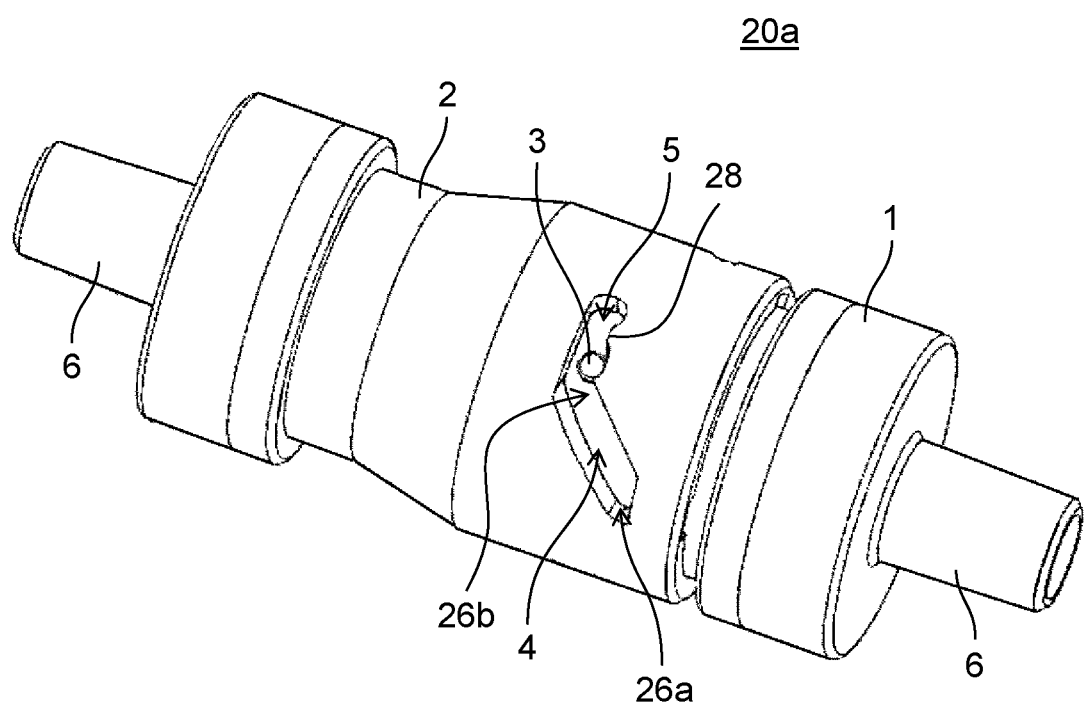
FIG. 7 is a schematic perspective view of the tube coupling, in a second modified example, according to the first exemplary embodiment, the view illustrating an outer appearance of the tube coupling in the open state where the flow path in the tube coupling is opened.

As a second modified example, one or a plurality of protrusions 28 may be provided in second through hole 5 such that projection 3 is not easily movable in the circumferential direction within the range of second through hole 5 (see, for example, FIG. 7). The configuration allows stable retention of projection 3 in second through hole 5.

A third through hole may further be included which is continuous with end 26a along the in-plane direction of the side surface, and which extends in the circumferential direction substantially perpendicular to the axial direction, on the side surface extending in a direction intersecting the axial direction. Here, end 26a is an end of first through hole 4, and is located on a side, in the insertion direction, from which insertion is made. As a result, male connector 1 can be stably retained in a state where male connector 1 is not pushed into female connector 2.

The insertion receiving part may further include a plurality of first through holes and a plurality of second through holes on the side surface around the axial direction. Further, a degree of freedom in an insertion position in the rotation direction of the projection that corresponds to a position of one of the plurality of first through holes may be adjustable.

SECOND EXEMPLARY EMBODIMENT

In a tube coupling according to a second exemplary embodiment, the outer diameters from first pressing member 9 to second pressing member 13 between first seal member 8 and second seal member 12 taper from outer diameter R1 of first seal member 8 to outer diameter R2 of second seal member 12.

With this configuration, it is possible to further reduce a space in which liquid remains between first seal member 8 and second seal member 12, and it is possible to further reduce liquid leakage at the time of disengagement.

Note that the present disclosure includes appropriate combination of any exemplary embodiment and/or example among the various exemplary embodiments and/or examples described above, and effects of the respective exemplary embodiments and/or examples can be achieved.

With the tube coupling according to the present disclosure, it is possible to reduce liquid leakage at the time of disengagement.

What is claimed is:

1. A tube coupling configured to connect and couple two tubes that are configured to cause a fluid to flow inside the two tubes, the tube coupling comprising:
    a male connector including a first pipe configured to cause the fluid to flow inside the first pipe, and an insertion part having a protruding shape, the insertion part protruding in an axial direction that is an insertion direction; and
    a female connector including a second pipe configured to cause the fluid to flow inside the second pipe, and an insertion receiving part having a recessed shape, the insertion receiving part being recessed in the axial direction, the insertion receiving part being coupled to the insertion part when the insertion part is inserted into the insertion receiving part in the insertion direction, wherein
    the insertion part includes:
        a first spring,
        a first pressing member having a protruding shape, the first pressing member protruding in the axial direction, the first pressing member being biased in the axial direction by the first spring when the male connector is not inserted into the female connector,
        a first seal member having an annular shape, the first seal member being disposed around the first pressing member, and
        a first outer peripheral member supporting the first spring in the axial direction, the first outer peripheral member being spaced from the first pressing member and surrounding the first pressing member,
    when the first pressing member is biased by the first spring, the first outer peripheral member is caused to abut on the first seal member, and a flow path between the first pipe and the second pipe is closed, and
    when the first spring is compressed, the first outer peripheral member is separated from the first seal member, and the flow path is opened,
    the insertion receiving part includes:
        a second spring,
        a second outer peripheral member,
        a second pressing member having a protruding shape, the second pressing member protruding in the axial direction, the second outer peripheral member being biased outward in the axial direction by the second spring when the male connector is not inserted into the female connector, the second pressing member being caused to abut on the first pressing member when the male connector is inserted into the female connector, and a second seal member having an annular shape, the second seal member being disposed around the second pressing member, wherein when the second outer peripheral member is biased by the second spring, the second outer peripheral member is caused to abut on the second seal member, and the flow path is closed, when the second outer peripheral member is not biased by the second spring, the second outer peripheral member is separated from the second seal member, and the flow path is opened, when the first spring biases the first pressing member and the second spring biases the second outer peripheral member, the first outer peripheral member is caused to abut on the first seal member and the second outer peripheral member is caused to abut on the second seal member, and the flow path is brought into a closed state, when the male connector is inserted into the female connector and the first spring and the second spring are compressed, the first outer peripheral member is separated from the first seal member and the second outer peripheral member is separated from the second seal member, and the flow path is brought into an open state, the second seal member has an outer diameter smaller than an outer diameter of the first seal member, the first outer peripheral member has a first taper in which an inner diameter of the first outer peripheral member tapers in the insertion direction, the first outer peripheral member has a second taper in which an inner diameter of the first outer peripheral member tapers in the insertion direction, the second taper being inward of the first taper with respect to the insertion direction, the second taper abuts on the first seal member in the closed state, and the second taper is tapered at a greater angle relative to the insertion direction than the first taper.

2. The tube coupling according to claim 1, wherein the first pressing member and the second pressing member have respective outer diameters that taper from the first seal member to the second seal member.

3. The tube coupling according to claim 1, wherein the female connector further includes:
an annular member surrounding both of the first outer peripheral member and the second outer peripheral member, and
an outer seal member configured to perform sealing between the second outer peripheral member and the annular member.

4. The tube coupling according to claim 1, wherein in the closed state,
a first portion of the first taper abuts on the first seal member,
a second portion of the first taper is spaced apart from the first pressing member, the second portion of the first taper being immediately behind the first seal member relative to the insertion direction, and
the first outer peripheral member and the first pressing member are both in direct contact with the first seal member.

* * * * *